US006934271B2

United States Patent
Zeira et al.

(10) Patent No.: US 6,934,271 B2
(45) Date of Patent: Aug. 23, 2005

(54) SUPPORT OF MULTIUSER DETECTION IN THE DOWNLINK

(75) Inventors: Ariela Zeira, Huntington, NY (US); Eldad Zeira, Huntington, NY (US); Alexander Reznik, Princeton, NJ (US); Stephen E. Terry, North Port, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 951 days.

(21) Appl. No.: 09/775,969

(22) Filed: Feb. 2, 2001

(65) Prior Publication Data

US 2001/0024426 A1 Sep. 27, 2001

Related U.S. Application Data

(60) Provisional application No. 60/180,402, filed on Feb. 4, 2000.

(51) Int. Cl.[7] .................................................. H04Q 7/00
(52) U.S. Cl. ........................ 370/329; 370/342; 370/343; 370/431; 375/140; 375/141; 375/145
(58) Field of Search ................................. 370/310, 320, 370/321, 335, 342, 343, 431, 441; 375/140, 141, 145, 149

(56) References Cited

U.S. PATENT DOCUMENTS 6,078,607 A    6/2000    Monroe et al.
6,339,612 B1 * 1/2002   Stewart et al. ............... 375/140
6,567,461 B1   5/2003    Moon et al.
6,611,513 B1   8/2003    ten Brink

FOREIGN PATENT DOCUMENTS

GB          2351422 A       12/2000
GB          2351422    *    12/2000    .................. 370/441
WO          WO9940698        8/1999
WO          WO9952249       10/1999

* cited by examiner

Primary Examiner—Wellington Chin
Assistant Examiner—Raj Jain
(74) Attorney, Agent, or Firm—Volpe and Koenig, P.C.

(57) ABSTRACT

A wireless time division duplex communication system using code division multiple access has a base station and user equipments. The system communicates using communication bursts. Each communication burst has a unique channelization code and a midamble code. Each midamble code is mapped to a set of at least one channelization code. For each communication burst to be transmitted in a time slot from the base station, the midamble code mapped to that burst's channelization code is determined. Communication bursts are generated and transmitted in the time slot. Each burst has the determined midamble code for its channelization code. The user equipment receives the bursts and determines each received midamble code. The user equipment determines the channelization codes of the transmitted communication bursts based on in part a result of the determining of each received midamble code.

13 Claims, 5 Drawing Sheets

SUPPORT OF MULTIUSER DETECTION IN THE DOWNLINK

This application claims priority from U.S. Provisional Patent Application No. 60/180,402, filed Feb. 4, 2000.

BACKGROUND

The present invention relates generally to wireless time division duplex using code division multiple access (TDD/CDMA) communication systems. In particular, the invention relates to determining channelization codes for use in multiuser detection in the downlink for TDD/CDMA systems.

A TDD/CDMA communication system is illustrated in FIG. 1. The system 10 has multiple base stations $12_1$ to $12_5$. Each base station $12_1$ has an associated operating area. User equipments (UEs) $14_1$ to $14_3$ in a base station's operating area communicate with that base station $12_1$. Communications transmitted from a base station $12_1$ to a UE $14_1$ are referred to as downlink communications and communications transmitted from a UE $14_1$ to a base station $12_1$ are referred to as uplink communications.

In a wireless TDD/CDMA communication system, multiple communications are sent in a shared frequency spectrum. One such system is proposed in a third generation wideband-CDMA (W-CDMA) standard. In CDMA systems, multiple communications are sent in the shared spectrum and are distinguished by channelization codes. In TDD/CDMA systems, the shared spectrum is also time divided using repeating frames having a fixed number of time slots, such as fifteen (15) time slots. Each time slot is used to transmit either only uplink or downlink communications. As a result, the communications are distinguished by both channelization codes and time slots. A single channelization code used in a single time slot is referred to as a resource unit. Based on a communications bandwidth, the communication may require one or multiple resource units. Typical data modulation schemes used in TDD/CDMA systems are quadrature phase shift keying (QPSK), binary phase shift keying (BPSK) and N Quadrature Amplitude Modulation (QAM), such as N=8, 16 or 64.

Data is transmitted in such systems using communication bursts 16. A communication burst 16 carries data in a single time slot using a single channelization code (a single resource unit). A typical communication burst 16 has a midamble 20, a guard period 18 and two data bursts 22, 24, as shown in FIG. 2. The midamble 20 separates the two data bursts 22, 24. The guard period 18 separates the communication bursts 16 to allow for the difference in arrival times of bursts 16 transmitted from different transmitters. The two data bursts 22, 24 contain the communication burst's data. The midamble 20 contains a midamble code for use in estimating the channel response between the receiver and transmitter.

Since multiple communication bursts may be transmitted in a single time slot, a receiver must be able to distinguish data from the multiple bursts. One approach to recover the received data is multiuser detection (MUD).

In MUD, a receiver recovers all communication bursts' data in a time slot, including bursts transmitted to other UEs. To recover all the bursts' data, the MUD receiver needs to know all of the channelization codes used to transmit the bursts. In the proposed TDD mode of W-CDMA, each UE $14_1$ to $14_3$ only knows which channelization and midamble codes are used for carrying information intended for it. To determine all the channelization and midamble codes, a bank of matched filters is used to detect all possible channelization/midamble combinations. The output power from each matched filter is compared to a threshold to determine whether a particular channelization/midamble combination was used. Due to the number of required matched filters, this approach has a high complexity. Additionally, if there is a high correlation between channelization codes, this approach may have poor performance. Accordingly, it is desirable to have alternate approaches for UEs $14_1$ to $14_3$ to be able to determine the active channelization codes.

SUMMARY

A wireless time division duplex communication system using code division multiple access has a base station and user equipments. The system communicates using communication bursts. Each communication burst has a unique channelization code and a midamble code. Each midamble code is mapped to a set of at least one channelization code. For each communication burst to be transmitted in a time slot from the base station, the midamble code mapped to that burst's channelization code is determined. Communication bursts are generated and transmitted in the time slot. Each burst has the determined midamble code for its channelization code. The user equipment receives the bursts and determines each received midamble code. The user equipment determines the channelization codes of the transmitted communication bursts based on in part a result of the determining of each received midamble code.

DETAILED DESCRIPTION OF THE PREFERRED EMBODIMENT(S)

Figure 1:
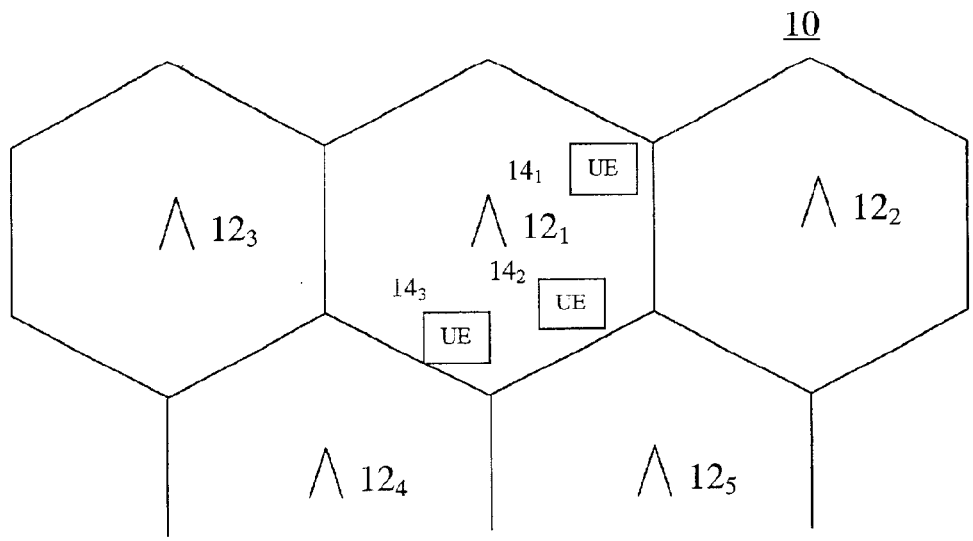
FIG. 1 is an illustration of a time division duplex/code division multiple access communication system.
Figure 2:
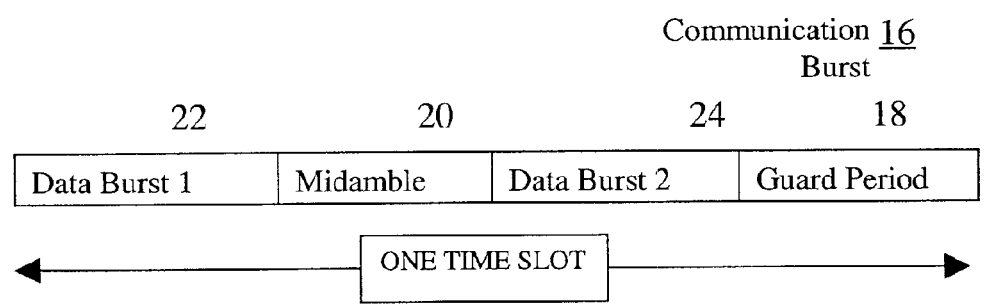
FIG. 2 is an illustration of a communication burst.
Figure 3:
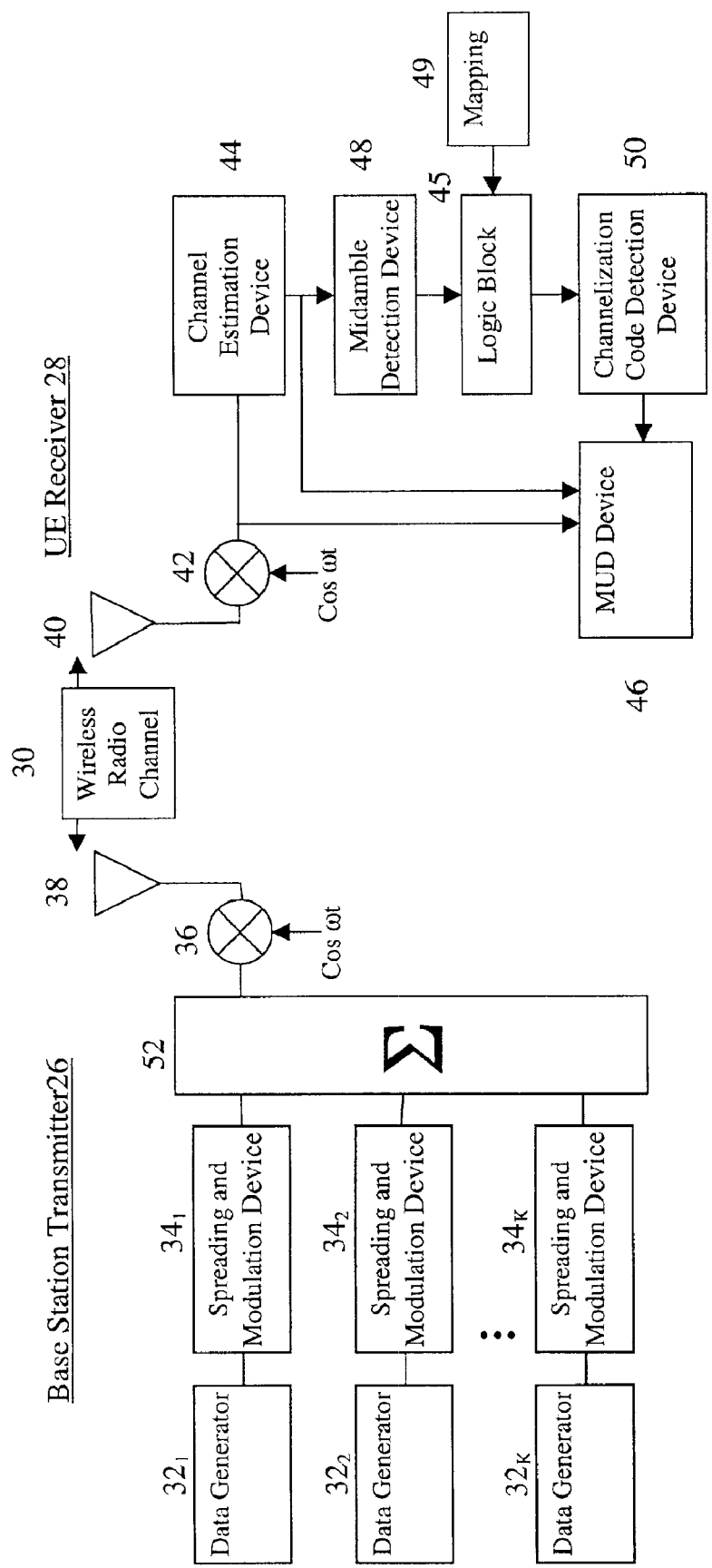
FIG. 3 is an illustration of a simplified base station transmitter and a user equipment receiver.

FIG. 3 illustrates a simplified base station transmitter 26 and a UE receiver 28 using multiuser detection (MUD). Data to be communicated to the active UEs $14_1$ to $14_3$ is produced by data generators $32_1$ to $32_K$. Each generator $32_1$ to $32_K$ produces data to be sent in a particular communication burst. Each communication burst's generated data is subsequently formatted into a communication burst by a spreading and modulation device $34_1$ to $34_K$. The spreading and modulation device $34_1$ to $34_K$ adds the midamble and spreads the generated data with a channelization code associated with that communication burst. Additionally, the spread data is time multiplexed into the appropriate time slot. All of the communication bursts are combined by a combiner 52. The combined communication bursts are modulated up to radio frequency, such as by a mixer 36, and the radio frequency signal is radiated by an antenna 38 through a wireless radio channel 30. If transmit diversity is utilized by the base station $14_1$, the radio frequency signal will be transmitted by multiple antennas.

At a UE receiver 28, radio frequency signals are received by an antenna 40. The received signals are demodulated to a baseband signal, such as by a mixer 42. A channel estimation device 44 is used to estimate the channel that the communication bursts were transmitted in using the transmitted midamble codes. A multiuser detection (MUD) device 46 processes the baseband signal using the estimated channel information and the active channelization codes to produce hard symbols.

Figure 4:
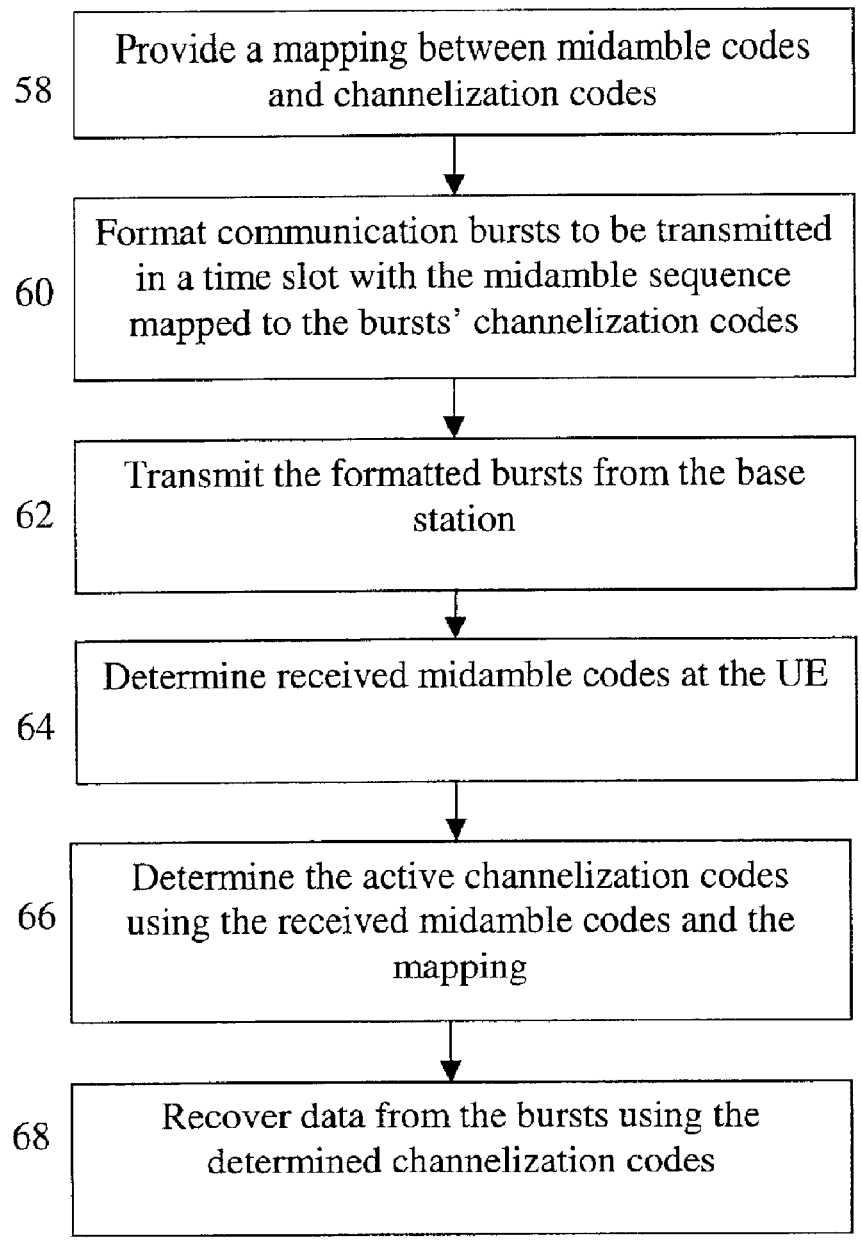
FIG. 4 is a flow chart of downlink channelization code identification.
Figure 5:
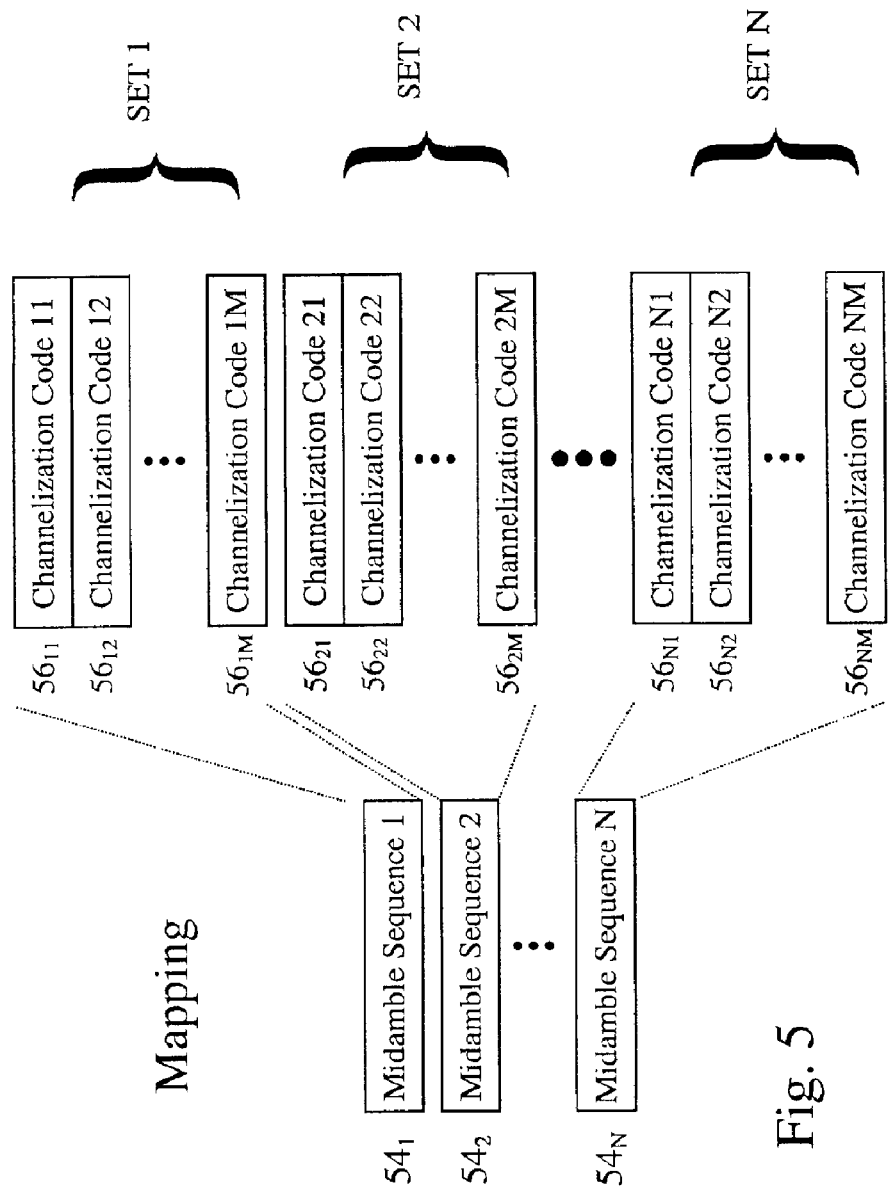
FIG. 5 is an illustration of midamble sequence to channelization code mapping.

Identifying active channelization codes is shown in the flow chart of FIG. 4. One approach to aid in identifying active channelization codes at the UE $14_1$ is to provide a mapping between midamble codes (midamble sequences) $54_1$ to $54_N$ and channelization codes $56_{11}$ to $56_{NM}$, 58. Each midamble sequence $54_1$ to $54_N$ is associated with a set of channelization codes $56_{11}$ to $56_{NM}$, as illustrated in FIG. 5. The sets may contain only a single channelization code, which is a one to one mapping of midambles to channelization codes. A burst transmitted by the base station $12_1$ with a channelization code of a midamble's set is formatted with that midamble sequence, 60, 62. To illustrate, if a burst with channelization code 21 was sent, midamble sequence 2 is used for that burst.

At the UE receiver 28, after channel estimation, the transmitted midamble sequences are detected by a midamble sequence detection device 48, 64. Based on the detected midambles, a logic block 45, utilizing the midamble to channelization code mapping 49, determines the set of possible channelization codes. A channelization code detection device 50 determines the received channelization codes based on the determination, 66. If a one midamble code to one channelization code mapping is used, the logic block 45 determines the channelization codes. As a result, for a one to one mapping, the channelization code detection device 50 is not used. The MUD device 46 uses the determined channelization codes and the channel response for the midamble sequences associated with the channelization codes to detect the data from all the bursts, 68.

Figure 6:
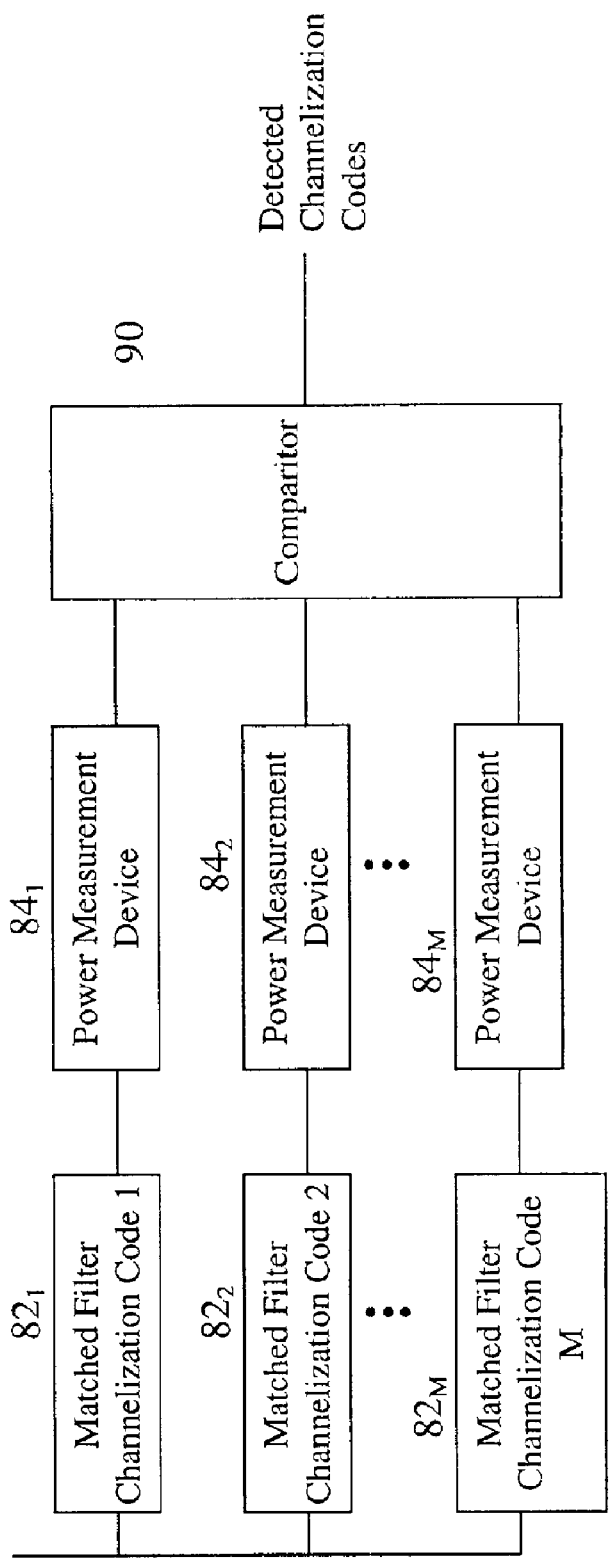
FIG. 6 is a channelization code detection device.

One channelization code detection device 50 is shown in FIG. 6. Matched filters $82_1$ to $82_M$ are matched to the possible channelization codes and associated channel responses as determined by the logic block 45. Since only the possible channelization codes need to be checked, the number of matched filters $82_1$ to $82_M$ is greatly reduced, reducing the complexity and improving the performance of the receiver 28. The power of the soft symbols produced by each matched filter $82_1$ to $82_M$ is measured by corresponding power measurement devices $84_1$ to $84_M$. The comparitor 80 determines the received channelization codes based on the power measurement for each channel. If the number of transmitted channelization codes is known, the comparitor 80 selects that number of channels with the highest measured power. Otherwise, the comparitor 80 compares each channel's power level to a threshold to determine the transmitted channelization codes.

To aid in identifying channelization codes, channelization code information, such as transmitted channelization codes or a number of transmitted channelization codes, may be signaled to the UE $14_1$. The signaled information can be used in conjunction with channelization/midamble code mapping or when mapping is not used. The additional channelization code information will increase the accuracy in determining the active channelization codes at the UE receiver 28. One such signal would be a layer one signal, where the midamble code or midamble code shift is associated with the information. The midamble detection device 48 determines the received midamble code(s) and the logic block 45 recovers the channelization code information using the determined midamble codes. Using the recovered information, the channelization code detection device 50 uses the recovered information to aid in the channelization code determination. Another approach signals channelization code information using a layer 2/3 signal. The signal is generated by the network circuitry. The layer 2/3 signal can be used in conjunction with layer one signals or with the midamble/channelization code mapping.

What is claimed is:

1. A wireless time division duplex communication system using code division multiple access, the system communicating using communication bursts, each communication burst having a unique channelization code and a midamble code, the system comprising:
   a base station having;
      a plurality of data generators for generating data to be communicated to user equipments;
      a plurality of spreading and modulation devices, operatively coupled to the data generators, for producing communication bursts in a time slot with the generated data, each produced communication burst having a midamble code which is associated with its channelization code; and
      a combiner and an antenna for combining and transmitting the communication bursts in the time slot;
   a plurality of user equipments, at least one having:
      an antenna for receiving the communication bursts;
      a midamble detection device for determining each received midamble code;
      a logic block for determining a channelization code associated with each received midamble; and
      a multiuser detection device for recovering data from the received communication bursts based on in part the determined channelization codes.

2. The system of claim 1 wherein the midamble codes are associated with the channelization codes based on a mapping between the midamble and channelization codes.

3. The system of claim 2 wherein each midamble code is mapped to one channelization code.

4. The system of claim 2 wherein at least one midamble code is plurality of channelization codes.

5. The system of claim 1 further comprising a channelization code detection block, operatively coupled to the logic block, for detecting channelization codes based on in part the determined associated channelization codes.

6. The system of claim 5 wherein the channelization code detection block only detects for the determined associated channelization codes.

7. The system of claim 6 wherein the channelization code detection block comprises a plurality of matched filters, each matched filter matched to one of the associated channelization codes and an associated channel response.

8. The system of claim 1 further comprising a channel estimation device using received midambles of the received bursts for channel estimation, the channel estimation is used by the midamble detection device, the channelization code detection device and the multiuser detection device.

9. A wireless time division duplex communication system using code division multiple access, the system communicating using communication bursts, each communication burst having a unique channelization code and a midamble code the system comprising:
   a base station having:
      a plurality of data generators for generating data to be communicated to user equipments;
      a plurality of spreading and modulation devices, operatively coupled to the data generators, for producing communication bursts in a time slot with the generated data, each produced communication burst having a midamble code which is associated with information of the channelization codes of the produced bursts; and a combiner and an antenna for combining and transmitting the communication bursts in the time slot;

a plurality of user equipments, at least one having:

an antenna for receiving the communication bursts;

a midamble detection device for determining each received midamble code;

a logic block for determining the channelization code information associated with each received midamble;

a channelization code detection block, operatively coupled to the logic block, for detecting channelization codes based on in part the determined channelization code information; and a multiuser detection device for recovering data from the received communication bursts based on in part the determined channelization codes.

10. The system of claim 9 further comprising a channel estimation device using received midambles of the received bursts for channel estimation, the channel estimation is used by the midamble detection device, the channelization code detection device and the multiuser detection device.

11. The system of claim 10 wherein each midamble code is uniquely associated with a shift of a base midamble code.

12. The system of claim 10 wherein the channelization code information is a transmitted channelization code.

13. The system of claim 10 wherein the channelization code information is a number of transmitted channelization codes.

* * * * *

UNITED STATES PATENT AND TRADEMARK OFFICE
CERTIFICATE OF CORRECTION

PATENT NO. : 6,934,271 B2  
DATED : August 23, 2005  
INVENTOR(S) : Zeira et al.

It is certified that error appears in the above-identified patent and that said Letters Patent is hereby corrected as shown below:

<u>Column 4,</u>  
Line 40, after "is", insert -- mapped to a --.

Signed and Sealed this

Twenty-eighth Day of March, 2006

JON W. DUDAS  
*Director of the United States Patent and Trademark Office*